No. 770,776. Patented September 27, 1904.

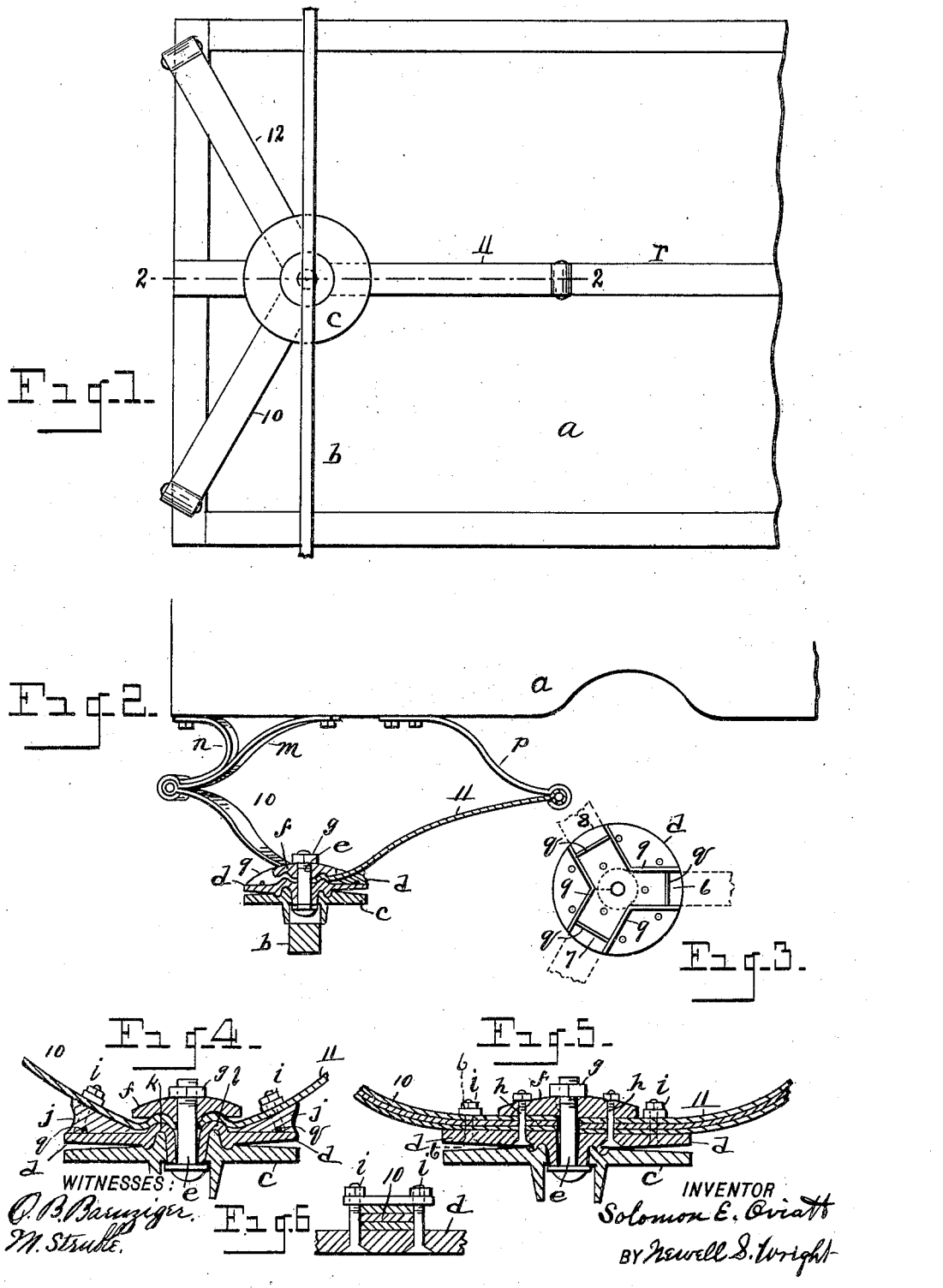

UNITED STATES PATENT OFFICE.

SOLOMON E. OVIATT, OF LANSING, MICHIGAN.

VEHICLE-SPRING AND COUPLING-PLATE.

SPECIFICATION forming part of Letters Patent No. 770,776, dated September 27, 1904.

Application filed April 16, 1903. Serial No. 152,851. (No model.)

*To all whom it may concern:*

Be it known that I, SOLOMON E. OVIATT, a citizen of the United States, residing at Lansing, county of Ingham, State of Michigan, have invented a certain new and useful Improvement in Vehicle-Springs and Coupling-Plates, of which the following is a specification, reference being had to the accompanying drawings, which form a part of this specification.

My invention has for its object certain new and useful improvements in vehicle-springs and coupling-plates; and it consists of the construction, combination, and arrangement of devices hereinafter described and claimed, and illustrated in the accompanying drawings, in which—

Figure 1 is an inverted plan view showing my invention applied to a vehicle-body. Fig. 2 is a view in side elevation and vertical section, the section being on the line 2 2, Fig. 1. Fig. 3 is a detail view in plan of the spring coupling-plate. Fig. 4 is an enlarged view in vertical section, showing the coupling-plates and adjacent ends of the springs. Fig. 5 is a similar view to Fig. 4, but showing a modification of the invention. Fig. 6 is a view in section on the line 6 6, Fig. 5.

The objects of my invention include the construction of a vehicle without a reach and the construction of a vehicle by which a short turn may be readily accomplished.

Furthermore, my invention is designed to provide a spring to be used independent of a reach and which will admit of the axle being carried sufficiently forward and yet permit the springs to be attached to the body of the vehicle without projecting too far forward or without the body projecting too far forward of the axle.

I accomplish my object by employing multiple springs, preferably three in number, diverging the one from the other, said springs approaching one another upon a suitable spring coupling-plate mounted upon the axle coupling-plate, as hereinafter set forth.

I carry out my invention as follows:

In the drawings, *a* represents any suitable body of a vehicle, and any suitable axle is indicated at *b*. Upon the axle is mounted in any suitable manner a coupling-plate or "fifth-wheel" *c*. Mounted thereupon is my improved coupling-plate, (indicated at *d*,) the same being provided with radial recesses (indicated by the numerals 6, 7, and 8) to receive the inner ends of corresponding springs therewithin. These radial recesses may be formed by upwardly-projecting flanges, (indicated at 9.) The coupling-plate is engaged upon the fifth-wheel or axle coupling-plate *c* by means of a bolt, (indicated at *e*.)

The numerals 10, 11, and 12 indicate the springs engaged upon the coupling-plate *d*, a washer or analogous device *f* being located upon the springs and held in engagement therewith by a nut *g*. The nut, however, might be enlarged to take the place of the washer, and I would have it understood that I do not limit myself to the employment of the washer. So, also, the inner ends of the springs within the scope of my invention might be engaged upon the coupling-plate without recessing said plate and without constructing the plate with the flanges 9, inasmuch as the inner ends of the springs may be bolted to the coupling-plate—as indicated, for example, by the bolts *h*—and may also be coupled thereupon by any suitable coupling, as indicated at *i*. Between the coupling-plate and the end of the springs may be interposed blocks *j*, of any suitable material, although I do not limit myself to the employment of the blocks. The coupler-plate may be provided with an annular bead toward the center, (indicated at *k*,) although I do not limit myself thereto, the bead, if employed, being formed about the central orifice of the plate through which the bolt *e* is passed. Where such a bead is employed, the fifth-wheel may be formed with the corresponding shoulder *l*. The outer ends of the springs 10, 11, and 12 may be united with the body of the vehicle in any suitable manner. As shown in Fig. 2, for example, a spring-arm *m* is shown attached to the body of the vehicle, an additional spring-arm *n* being carried forward and attached to the body of the vehicle. I do not limit myself, however, to the employment of two attaching-arms, as either of the arms *m* or *n* might serve the purpose of my invention. So, also, the rearwardly-extending spring 11 may be attached to the vehicle-body in any suitable manner, as by means of an attaching-arm p.

By the employment of three springs radially attached to the spring coupler-plate d it is evident that the two forwardly-projecting springs are carried also laterally, so that the springs may be made of much greater length than if simply carried forward and attached to the front of the vehicle-body. I prefer to have the inner ends of the springs to extend adjacent to and contact with the bolt e. I prefer to construct the coupler-plate with upwardly-projecting ribs q, especially where the intervening blocks j are employed, although I do not limit myself to their employment. It will be seen that the means above described for uniting the inner ends of the springs upon the coupler-plate affords a very firm engagement of the springs upon said plates, so that the leverage upon the outer ends of said springs will not be liable to loosen or disengage the springs from the plate. It is evident that the spring coupler-plate has an oscillatory engagement upon the axle coupler-plate or fifth-wheel. By employing three springs radially attached to the spring coupler-plate it is evident that two of the springs may be carried forward and laterally to the front corners of the vehicle-body, while the rearwardly-extending spring may be attached to a central brace or cross-cleat (indicated at r) or directly to the bottom of the vehicle-body.

While I prefer to employ three independent radially-extending springs attached to the spring coupler-plate, it is obvious that the springs might be formed in an integral construction, said construction provided with three spring-arms diverging as above described, and I consider such a construction included in my invention. While I prefer to use three springs arranged as described, I would have it understood that my invention contemplates plural springs of any desired number independently attached at their inner ends to the spring coupler-plate. It will be noticeable that by using independent springs converging at their inner ends upon the spring coupler-plate the same may all come to a common center on the same level or without one crossing another. I prefer to bevel the inner ends of the springs, the inner edges of the springs being also cut away on an arc of a circle to fit about the bolt e. I have shown both a single-leaf and a multiple-leaf spring; but I would have it understood that I do not confine myself to any particular number of leaves of which the spring is composed.

What I claim as my invention is—

1. The combination with an axle coupler-plate or fifth-wheel, of a spring coupler-plate having an oscillatory engagement thereupon, said plate constructed with plural radial diverging recesses, and three independent diverging springs having their inner ends located in said recesses respectively, means to secure the inner ends of each of said springs in the corresponding recess of the plate and means for attaching the outer ends of the springs to a vehicle-body.

2. The combination with an axle coupler-plate or fifth-wheel, of a spring coupler-plate having an oscillatory engagement thereupon, three independent diverging springs having their inner ends converging upon said spring coupler-plate, a bolt and nut to unite the spring coupler-plate and the inner ends of said springs upon the axle coupler-plate, and additional means to unite the inner ends of the springs upon the spring coupler-plate.

3. The combination with an axle coupler-plate or fifth-wheel, of a spring coupler-plate having an oscillatory engagement thereupon, said plate constructed with plural radial recesses, and three independent diverging springs having their inner ends united to said spring coupler-plate in the corresponding recesses of the plate, upon the same plane, said springs provided at their outer ends with means for attachment to a vehicle-body.

4. The combination with an axle coupler-plate or fifth-wheel, of a spring coupler-plate having an oscillatory engagement thereupon, three independent diverging springs having their inner ends converging upon said plate upon the same level, a bolt and nut to unite said springs and coupler-plate upon the axle coupler-plate or fifth-wheel, and additional means to unite the inner ends of the springs upon the spring coupler-plate.

In testimony whereof I have signed this specification in the presence of two subscribing witnesses.

SOLOMON E. OVIATT.

Witnesses:
N. S. WRIGHT,
M. M. STRUBLE.